July 17, 1934.    F. G. HENRY    1,966,626
SELF CLEANING CONTINUOUS FILTER
Filed April 13, 1932    3 Sheets-Sheet 1

INVENTOR.
Ferdinand G. Henry
BY
Lancaster, Allwine and Rommel
ATTORNEYS.

July 17, 1934.　　　　F. G. HENRY　　　　1,966,626
SELF CLEANING CONTINUOUS FILTER
Filed April 13, 1932　　　3 Sheets-Sheet 2

INVENTOR.
Ferdinand G. Henry

BY Lancaster, Allwine and Rommel
ATTORNEYS.

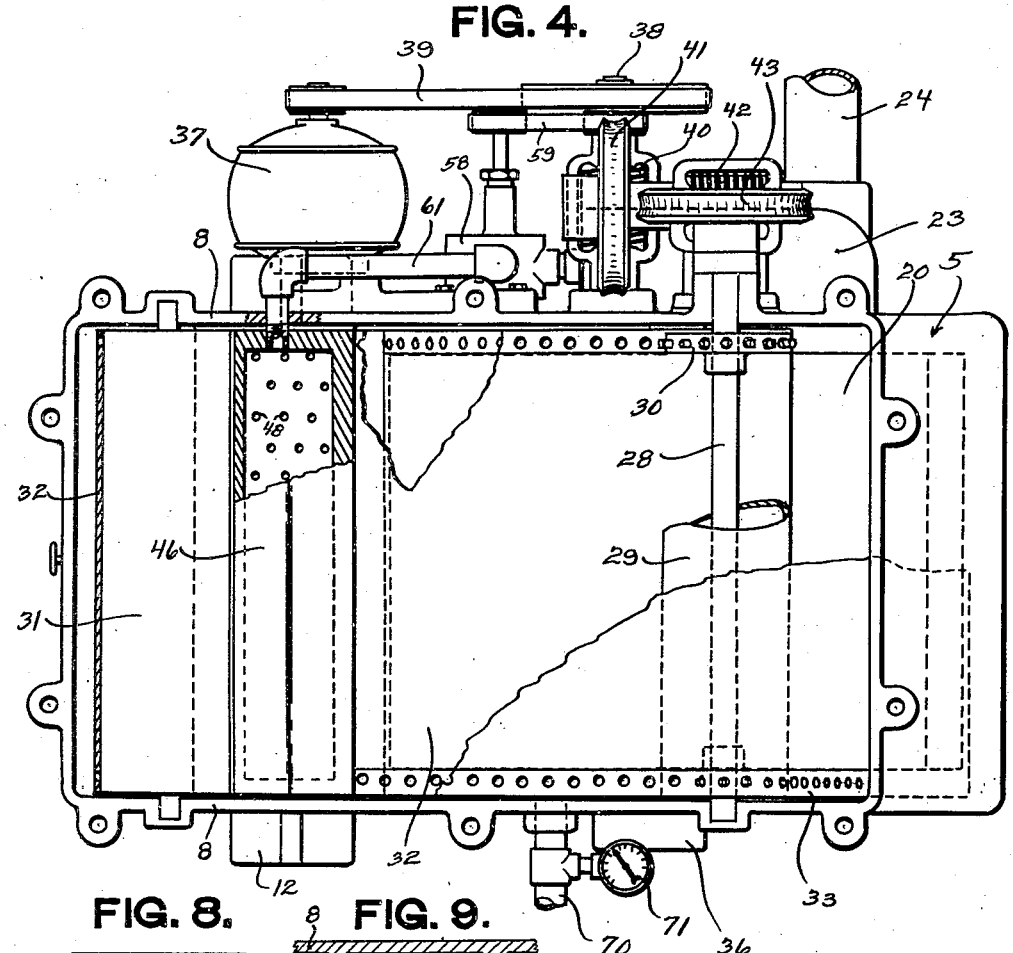
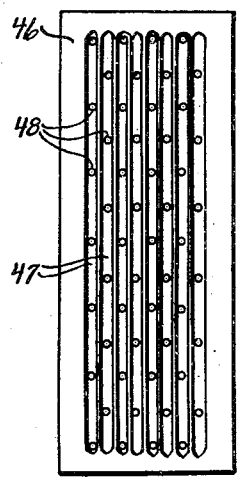
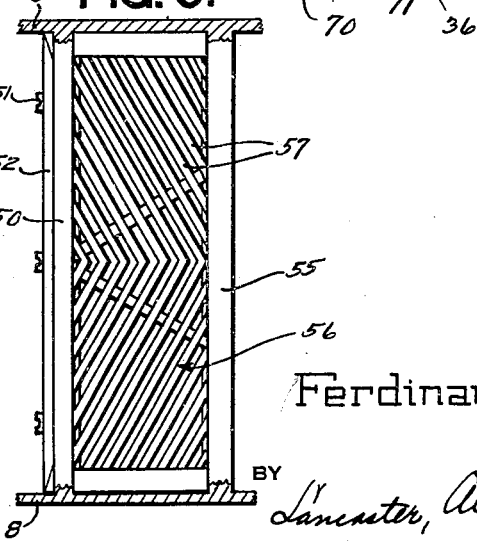

Patented July 17, 1934

1,966,626

UNITED STATES PATENT OFFICE 1,966,626

SELF-CLEANING CONTINUOUS FILTER

Ferdinand G. Henry, Moline, Ill.

Application April 13, 1932, Serial No. 605,058

16 Claims. (Cl. 210—198)

The present invention relates to filtering apparatus and the primary object of the invention is to provide a filtering device which will be self-cleaning in its operation to permit continuous operation of the filtering process.

A further object of the invention is to provide a self-cleaning continuous filter embodying a filtering element continuously movable into the filtering zone, with means for automatically cleaning the filtering element without interruption of the filtering process.

A further object of the invention resides in the novel arrangement whereby the endless filtering element is constantly and continuously moved between filtering and cleaning zones and the arrangement for thoroughly cleaning the filtering element prior to return to the filtering zone.

A further object resides in the novel arrangement wherein the filtering and cleaning of the filtering element is accomplished within a single casing or housing and the arrangement whereby the collected solid may be removed from the casing without interrupting the filtering operation.

A still further object resides in the novel arrangement whereby a small quantity of the filtered liquid is employed for cleaning the filtering element, and the arrangement whereby the cleaning fluid for the filtering element is returned to the filtering zone.

A still further object resides in the arrangement whereby the filtering process may be carried on either by gravity or placing the liquid under air pressure, thereby permitting efficient filtering of various forms of liquid.

Other objects and advantages of the invention will be apparent during the course of the following detailed description, taken in connection with the accompanying drawings, forming a part of this specification and in which drawings:—

Figure 4 is a top plan view showing the cover of the casing removed and portions of the apparatus broken away.

Figure 8 is a bottom plan view of the washer shoe.

Figure 9 is a top plan view of the combined centering and bearing grate for the washer shoe.

Figure 3:
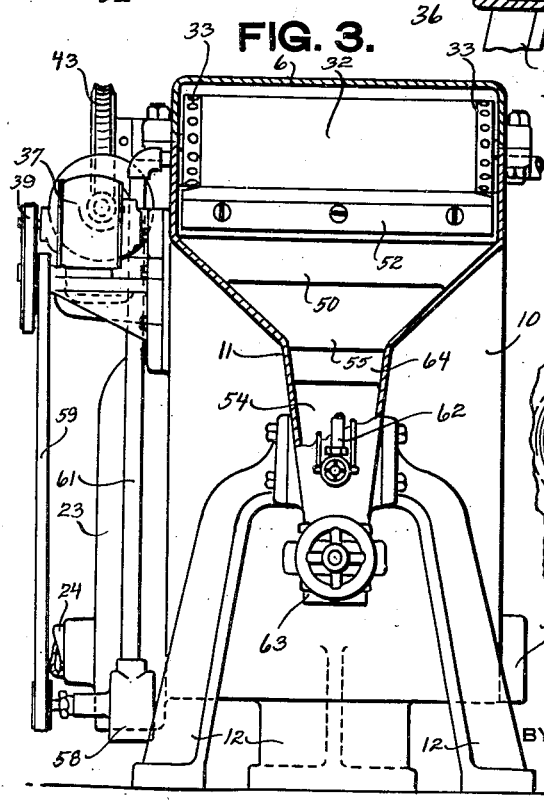
Figure 3 is a view part in section and part in end elevation, the section being substantially on the line 3—3 of Figure 1.
Figure 5:
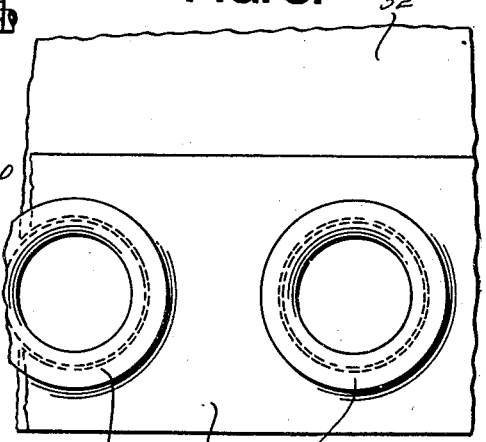
Figure 5 is an enlarged fragmentary view of one edge portion of the filter belt.

In the drawings, and wherein similar reference characters designate corresponding parts thruout the several views, the letter A designates a closed housing or casing formed with a lower main body portion 5 closed at its upper open side by a cover 6 secured to the lower portion by suitable bolts 7 extended thru apertured ears formed on the casing portions 5 and 6. The main body portion 5 is formed with parallel side walls 8 and has a vertical partition wall 9 which extends between the side walls 8 adjacent the forward end of the casing to provide a rear main tank portion 10 providing a filtering tank portion, and a small or minor front tank portion 11 providing a sediment tank portion. The horizontal upper edge of the partition wall 9 is spaced below the top of the lower casing portion 5 and the upper edge of this partition wall forms the normal liquid level of the fluid in the casing. The casing is preferably supported upon three legs 12, one being arranged beneath the rear portion of the tank portion 10 and the other two legs supporting the forward portion of the casing from the lower end of the tank portion 11 as clearly shown in Figure 3.

The main tank portion 10 is preferably formed with a circular wall providing a filter chamber 13 having mounted therein a filtering cylinder or drum 14 embodying solid disc-shaped end plates 15 and a cylindrical perforated wall 16 secured by a leak-proof joint to the periphery of the discs 15. The drum 14 is mounted upon a horizontal shaft 17 which is freely rotatable in bearings 18 in the casing side walls 8. The rotatable drum 14 as will be observed in Figures 1 and 2 does not completely fill the chamber 13 and permits free circulation of the liquid about all sides of the drum. It will also be noted in Figure 1 that the filtering drum is arranged below the upper edge of the partition wall 9 forming the normal liquid level in the filter chamber so that the entire drum is submerged in the liquid to be filtered.

Figure 2:
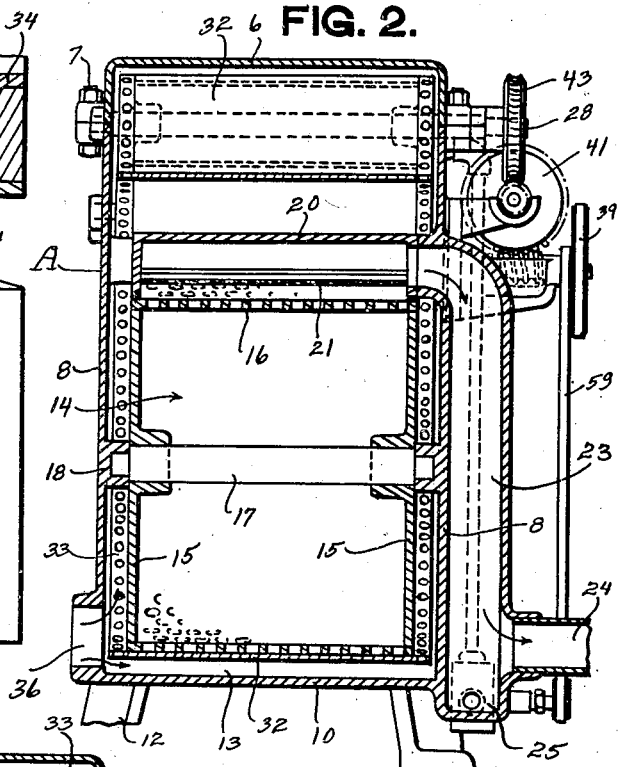
Figure 2 is a vertical section on a reduced scale on the line 2—2 of Figure 1.

Extended across the entire width of the drum 14 and suitably supported at its end by the casing walls 8, is a collector hood 20 having an open lower side confronting the perforated cylindrical wall 16 of the filtering drum. The collector hood 20 is of a length equal to the width of the drum 14 and is provided about its open side with a suitable packing 21 adapted to bear against the periphery of the drum and form a leak-proof joint between the interior of the drum and the interior of the collector head. This packing 21 is of a nature to permit rotation of the drum 14 without producing any appreciable amount of drag upon the drum. Communication will be had between the drum 14 and collector hood 20 thru the perforations in the drum wall 16 as the perforations move past the open side of the collector hood. The collector hood is closed at one end and has an opening 22 at its opposite end communicating with a discharge leg 23 extended downwardly along one side wall of the casing and provided adjacent its lower end with an outlet 24. This outlet 24 as will be observed in Figure 2 provides a shallow well 25 at the lower end of the discharge leg 23. As will be noted, the collector hood 20 is also disposed below the normal liquid level in the casing.

Figure 1:
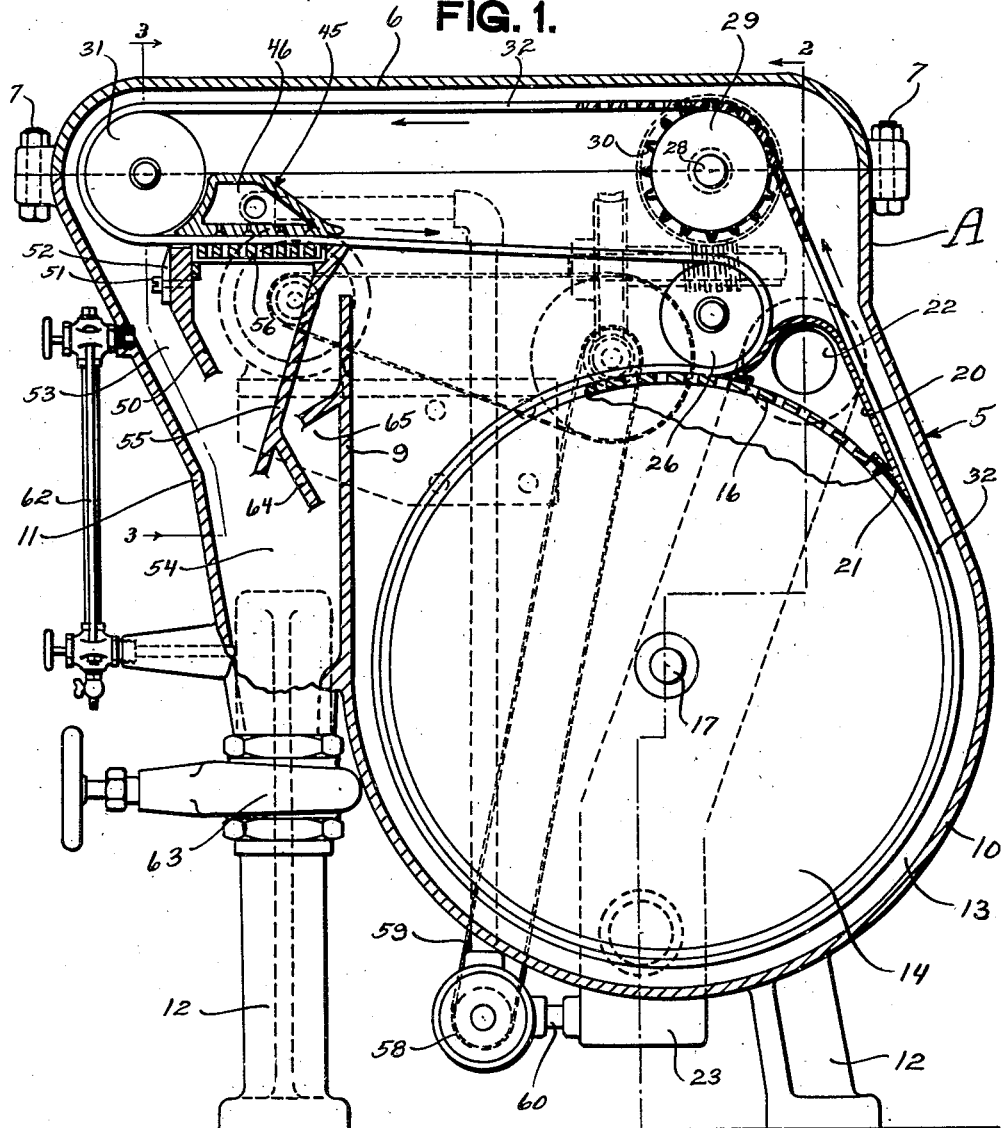
Figure 1 is a vertical section thru the improved filter.
Figure 7:
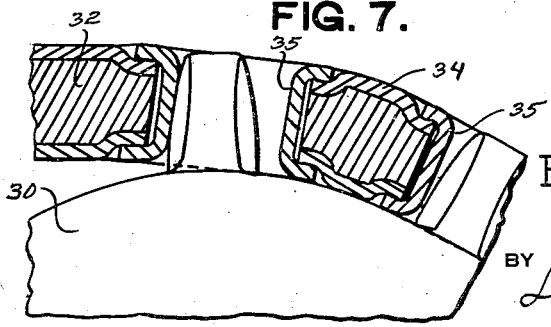
Figure 7 is a fragmentary sectional view showing the manner in which the reinforced driving edges of the filter belt engage the driving sprockets for the belt.

Journaled in the side walls 8 in close proximity above the filter drum 14 and along the forward side of the collector hood 20 is an idler roll 26, the collector hood having its forward wall concaved as shown in Figure 1 on an arc concentric with the axis of the idler roll.

Journaled in the casing directly above the idler roll 26 is a drive shaft 28 carrying a drive roll 29 provided at each end with a sprocket 30, the sprockets 30 being arranged just inwardly of the casing side walls 8. Journaled in the forward overhanging end of the casing in parallel relation to the rolls 26 and 29 is an idler roll 31 and this idler roll 31 is disposed forwardly of the vertical partition wall 9.

Figure 6:
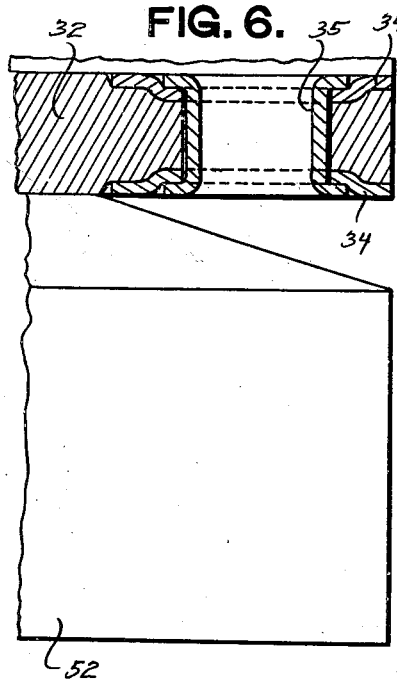
Figure 6 is an enlarged fragmentary view part in section and part in elevation showing the construction of the side edges of the filter belt, and the manner in which the scraper blade is beveled at its ends.

Encircling the filter drum 14 and looped about the rolls 26, 29 and 31 in the manner shown in Figure 1 is an endless filter belt 32 formed of any preferred material such as a textile fabric or other porous flexible material. This filter belt 32 is of a width greater than the width of the filter drum 14 and is provided along each edge with a metal binding strip or edging 33 providing driving means for the belt. Referring particularly to Figure 6, the metal edgings 33 are preferably formed by the two thin metal binding strips 34 arranged one at each side of the belt and running parallel with the edges thereof. The strips 34 are secured together by means of evenly spaced apart eyelets 35 having their ends spun or riveted over the strips 34. In the spinning operation the ends of the eyelets are preferably sunk below the surfaces of the strips 34 and forcing the edges of the strips around the holes into the belt 32 which is sufficiently compressible to permit sinking of the ends of the eyelets flush with the outer surfaces of the binding strips. These apertured binding strips are disposed beyond the end plates 15 of the filtering drum and form the equivalent of sprocket chains for engaging the teeth of the driving sprockets 30.

By having the filter belt, where it leaves the periphery of the filtering drum, closely contact the sides of the collector hood, causes a complete closing of all of the perforations in the cylindrical wall 16 with the exception of those openings passing beneath the open side of the collector hood. This prevents entrance of any unfiltered liquid from the chamber 13 into the drum 14 without passage of the liquid thru the filter belt. The liquid to be filtered is admitted to the chamber 13 thru a suitable inlet 36 provided in the lower end of one of the casing side walls 8.

Suitably mounted upon one of the casing side walls 8 is an electric motor 37 for driving a shaft 38 thru the belt drive 39. The shaft 38 carries a worm 40 meshing with a worm wheel 41 on the shaft of which is a worm 42 meshing with a worm wheel 43 fixed to a projecting end of the drive shaft 28. This drive between the shaft 38 and 28 provides a speed reduction gearing whereby the filter belt will have a relatively slow movement imparted thereto. The speed at which the filter belt is moved will of course vary in accordance with the particular filtering operation being performed.

Arranged above the minor or forward tank portion 11 is a washer 45 for cleaning the filter belt prior to return to the filter drum 14. This washer or cleaning means for the filter belt comprises a hollow washing shoe 46 mounted closely adjacent the idler roll 31 directly above the lower run of the filter belt and suitably supported at its ends in the casing side walls 8. The washing shoe 46 covers the entire width of the filter belt and is provided at its flat lower side with a series of parallel grooves 47 having communication with the interior of the shoe by a series of small apertures 48. Arranged below the forward edge of the washing shoe and beneath the run of the filter belt is a partition 50 which extends between the side walls 8 and has mounted upon its front side as by suitable screws 51, a scraper blade 52 having a beveled upper edge adjustable into scraping engagement with the outer surface of the filter belt for scraping the excess of accumulated material from the belt prior to passage beneath the washing shoe 46. The partition wall 50 is spaced from the front wall of the minor tank portion 11 and provides a passageway 53 whereby the material scraped from the filter belt may pass into the well or chamber 54. Arranged along the rear edge portion of the washing shoe 46 and extending between the side walls 8 of the casing is a partition wall 55 which extends into the sediment chamber 54 between the partitions 50 and 9. Supported between the upper portions of the partitions 50 and 55 directly below the washing shoe 46 is a grate 56 preferably constructed of angular diverging bars 57 converging toward the center of the grate in the direction of passage of the filter belt over the grate. The object in so arranging the bars 57 in the grate 56 is to cause the belt to normally remain centered during operation.

Fluid for the washer 45 is supplied by means of a force pump 58 driven by a belt 59 from the shaft 38. The intake 60 for the pump connects with the well 25 at the lower end of the discharge leg 23 and suitable piping 61 connects the pump with the interior of the hollow washing shoe 46 whereby a small quantity of the filtered liquid is returned for washing the filter belt.

A glass cage 62 of conventional design is provided for the tank portion 11 to indicate the level of sediment within the chamber 54 and a dump valve 63 is provided at the lower end of the chamber 54 for discharging the sediment collected in the chamber when required.

The depending partition walls 50 and 51 have their lower ends arranged below the top of the partition wall 9. The partitions 9 and 55 are provided with baffle plates 64 providing a separator chamber or passageway 65 permitting liquid in the chamber 54 to flow over into the filter chamber 13.

As before stated, the normal level of the liquid to be filtered is kept at a line even with the upper edge of the partition wall 9 and which normal liquid level is at a point above the collector hood 20. This permits the filtering operation to be accomplished by force of gravity.

If pressure is required for filtration of the liquid, compressed air is introduced over the liquid thru the compressed air inlet 70 provided with the gauge 71 permitting control of pressure in the closed casing A.

Referring particularly to Figure 1, it will be noted that the return run of the belt to the filter drum is above the normal liquid level in the casing and out of contact with the unfiltered liquid until at a point shortly before the belt encircles the drum. It will also be noted that the filter drum is rotated by the belt having movement imparted thereto by the sprockets 30. Thus, we have a filtering process occurring in the filtering chamber 13 and a washing process for the continuous filter belt occurring above the collecting chamber 54 with a portion of the filtered liquid returned and used as a washing medium for the filtering belt. The filtering operation will be continuous.

In operation of the self-cleaning continuous filter, the motor 37 is started and liquid admitted thru the inlet 36 at a rate to maintain a liquid level in the casing even with the upper edge of the partition 9. Operation of the motor 37 thru the pulley 39 and the reduction gearing rotates the drive shaft 28 carrying the sprockets 30 which impart movement to the filter belt in the direction of the arrows for continuously moving a cleaned run of the filter belt to the filter drum 14. The liquid in the chamber 13 passes thru the filter belt and perforations in the cylindrical wall 16 of the drum and this filtered fluid within the drum when the drum is filled, passes thru the perforations into the collector hood 20 where it flows by gravity thru the discharge leg 23 to the outlet 24. The force pump 58 draws a small amount of this cleaned and filtered liquid from the well 25 and delivers this liquid into the hollow washing shoe 46 where it is forced thru the filter belt in the opposite direction to that of the unfiltered liquid passing thru the belt from the chamber 13 into the rotating filter drum. In other words, when the filter belt is in the filtering zone about the drum 14, the liquid travels from the outside of the belt toward the inside or inner surface, while in the washing zone, the cleaning liquid travels thru the belt from the inner surface to the outer surface thereby forcing the dirt out of the belt. The dirt and muck removed from the belt by the scraper blade 52 and washer 45 collects in the chamber 54 where, after it reaches a predetermined level may be removed by simply opening the dump valve 63 and without interrupting the continuous operation of the filter. The washing liquid forced thru the filter belt at the washer 45 rises thru the separator 65 and returns over the top of the partition 9 to the filter chamber 13, the baffle plates 64 tending to prevent return of muck to the filter chamber. Thus the process is continuous and without loss of fluid or interruption of the filtering operation. After the filter belt is thoroughly cleaned and washed at the washer 45, the belt moves to the idler roll 26 and hence about the drum 14 providing a continuously moving, clean filtering surface about the drum.

The filtering drum 14 may be of various diameters and lengths for varying the filtering area of the drum and likewise the filter belt may also be made of different density and different penetrative rate so that different stages or quality of filtration may be obtained and also any rate of filtration. The rate of travel of the filter belt may also be regulated if desired to give any predetermined rate of complete change of filter belt surface upon the drum 14. By having the filtering apparatus enclosed within a closed casing will also allow for the rate of filtration to be varied by introducing compressed air into the casing over the liquid to increase the penetrative rate of the liquid about the drum 14.

Thus with the novel and unique form of filtering apparatus disclosed, a means is provided for constantly and continuously removing a muck laden filtering element out of the filtering zone and simultaneously replacing it with a clean filtering element automatically and without interruption of the filtering process. The apparatus also embodies a novel and unique method of cleaning the muck laden filtering element and returning the same to the filtering zone for reuse in an interrupted process. The novel arrangement is also provided for collecting the muck removed from the filtering element and removing the muck from the filter without interrupting the filtering operation. The apparatus further permits of a small quantity of the filtered liquid to be returned to the filter for use in cleaning the filtering element and which liquid is subsequently returned to the filtering zone.

Changes in detail may be made to the form of invention herein shown and described, without departing from the spirit of the invention or the scope of the following claims.

I claim:

1. In a filter, a partitioned casing providing a filtering zone and a cleaning zone, an endless filter belt continuously movable between the filtering and cleaning zones, means for washing the filter belt in its passage thru the cleaning zone, and a separator passageway permitting return of the washing fluid to the filtering zone.

2. In fluid filtration apparatus, a peripherally perforated drum to be wholly submerged in the liquid to be filtered, an endless filter belt looped about the drum and looped away from said drum at spaced points on the periphery of said drum, means for imparting travel to the belt, a collector hood extending along the peripheral wall of the drum for collecting filtered liquid from the drum, means for cleaning the belt while looped away from the drum, and means for returning a portion of the filtered liquid to the means for cleaning the belt.

3. In a filter, a casing provided with a filter chamber and a sediment chamber, a peripherally perforated drum rotatable in the filter chamber, an endless filter belt looped about the filter drum and looped therefrom to extend above the sediment chamber, cleaning means for the belt including a hollow washing shoe arranged above the sediment chamber, a collector hood permitting escape of liquid from the drum, means for supplying cleaning liquid to the washing shoe, a separator permitting return of the washing liquid from the sediment chamber to the filter chamber, and valve means for removing sediment from the sediment chamber.

4. In a filter, a casing provided with filter and sediment chambers, a peripherally perforated drum rotatable in the filter chamber, a collector hood having an open side extended across the peripheral wall of the drum, and endless filter belt looped about the drum and extending therefrom in contact with the collector hood, a drive roll for the filter belt, a grate arranged above the sediment chamber and over which the belt extends, a hollow washing shoe arranged directly above the grate and having a perforated bottom, a fluid inlet for the filter chamber, a dump valve for the sediment chamber, means for supplying a quantity of the filtered fluid to the washing shoe, and a return passageway between the sediment chamber and filter chamber for return of the washing fluid to the filter chamber.

5. In a filter, a casing providing a filter chamber having an inlet opening, a peripherally perforated drum rotatable in the chamber below the liquid to be filtered, an endless filter belt looped about the drum and looped away therefrom at spaced points on the periphery of the drum, a collector hood engageable with the perforated wall of the drum between the points where the belt loops away from the drum, said hood being disposed below the normal liquid level in the filter chamber and having an outlet opening, means for imparting continuous travel to the filter belt, and means for cleaning the belt in its travel.

6. In a filter, a casing having a vertical partition wall providing a filter chamber and a sediment chamber, said filter chamber having an inlet opening, a drum rotatable in the filter chamber and having perforations in its cylindrical wall, a collector hood having an open side communicating with the interior of the drum thru the perforations in the cylindrical wall, an endless filter belt looped about the peripheral wall of the drum and contacting the collector hood to prevent passage of liquid from the filter chamber to the interior of the drum except thru the filter belt, drive and idler rolls for looping the belt from the drum, means for imparting rotation to the drive roll, washing means for the belt arranged above the sediment chamber, and a dump valve for the sediment chamber.

7. In a filter, a casing having a vertical partition providing a filter chamber and a sediment chamber, the upper edge of said partition wall forming the liquid level of the liquid to be filtered, a peripherally perforated drum rotatable in the filter chamber below the upper edge of the partition wall, an inlet passageway for the filter chamber, a collector hood extended entirely across the periphery of the filter drum and having an open side confronting the drum, said collector hood being disposed below the upper edge of the partition wall, a discharge leg communicating with the collector hood, an endless filter belt looped about the drum and extended therefrom in contact with the collector hood, a drive roll for imparting travel to the belt, an open grate arranged above the sediment chamber and over which the belt has movement, a hollow washing shoe arranged directly above the grate and having a perforated bottom wall, means for supplying liquid to the hollow washing shoe, a separator passageway between the sediment and filter chambers for return of the washing liquid to the filter chamber, and a dump valve for the filter chamber.

8. In a filter, a casing having a filter chamber provided with an inlet opening for the liquid to be filtered, a drum rotatable in the chamber including solid end plates and a perforated cylindrical wall, said drum being mounted below the normal liquid level of the liquid to be filtered, a collector hood having an open side contacting with the perforated wall of the drum, said collector hood being disposed below the liquid level in the chamber, a discharge leg for the collector hood, an endless filter belt looped about the cylindrical wall of the drum and extending therefrom in contact with the collector hood, means for imparting continuous travel to the filter belt, and means for washing the belt at a run thereof removed from the filter drum.

9. In a filter, a casing having a vertical partition wall providing a filter chamber and a sediment chamber, a drum rotatable in the filter chamber and having a perforated cylindrical wall, an inlet for supplying liquid to be filtered into the filter chamber, a collector hood having an open side contacting the cylindrical wall of the drum, an endless filter belt trained about the cylindrical wall of the drum and looped therefrom in contact with the collector hood, a drive roll for imparting continuous travel to the belt, an idler roll carrying a run of the belt above the sediment chamber, an open grate mounted above the sediment chamber and over which said run of belt has travel, a hollow washing shoe arranged over the grate in contact with the run of belt and having a perforated bottom wall, means for delivering washing liquid into the hollow washing shoe, a separator passageway between the sediment and filter chambers permitting return of the washing liquid to the filter chamber, and a dump valve for the sediment chamber.

10. In a filter, a casing having a vertical partition wall providing a filter chamber and a sediment chamber, a drum rotatable in the filter chamber and having a perforated cylindrical wall, a collector hood having an open side engaging the perforated wall, a discharge leg for the collector hood, an endless filter belt looped about the perforated wall of the drum and extended therefrom in contact with the collector hood, partition walls depending into the sediment chamber from a point above the top of said first mentioned partition wall, an open grate mounted between the upper ends of the depending partition walls and over which the filter belt travels, a hollow washing shoe arranged in contact with the belt directly above the grate and having a perforated bottom wall, means for imparting continuous travel to the belt, means for returning a portion of the filtered liquid from the discharge leg to the hollow washing shoe, a separator passageway permitting return of the washing liquid from the sediment chamber into the filter chamber, a sight gauge for the sediment chamber, and a dump valve for the sediment chamber.

11. In a filter, a casing having an upstanding partition wall providing a filter chamber and a sediment chamber, said filter chamber having an inlet for the liquid to be filtered, a filter drum rotatable in the filter chamber and having a perforated cylindrical wall, a collector hood extended across the drum and having an open side contacting the peripheral wall of the drum, a discharge leg communicating with the collector hood, a filter belt looped about the drum and extending therefrom in contact with the collector hood, means for imparting continuous travel to the belt, said belt being looped above the sediment chamber, a pair of depending partition walls extending into the sediment chamber, an open grate arranged between the depending partition walls and over which the belt has travel, a hollow washing shoe contacting the belt directly above the grate and having a perforated lower wall, a scraper for contacting the belt in advance of travel between the washing shoe and grate, a force pump for delivering filtered liquid from the discharge leg into the hollow washing shoe, a separator passageway formed between the upstanding partition wall and one of the depending partition walls permitting return of the washing liquid in the sediment chamber to the filter chamber, and a dump valve for the sediment chamber.

12. In a filter, a casing having an upstanding partition wall providing a filter chamber and a sediment chamber, said filter chamber having an inlet for the liquid to be filtered, a filter drum rotatable in the filter chamber and having a perforated cylindrical wall, a collector hood extended across the drum and having an open side contacting the peripheral wall of the drum, a discharge leg communicating with the collector hood, a filter belt looped about the drum and extending therefrom in contact with the collector hood, means for imparting continuous travel to the belt, said belt being looped above the sediment chamber, a pair of depending partition walls extending into the sediment chamber, an open grate arranged between the depending partition walls and over which the belt has travel, a hollow washing shoe contacting the belt directly above the grate and having a perforated lower wall, a scraper for contacting the belt in advance of travel between the washing shoe and grate, a force pump for delivering filtered liquid from the discharge leg into the hollow washing shoe, a separator passageway formed between the upstanding partition wall and one of the depending partition walls permitting return of the washing liquid in the sediment chamber to the filter chamber, a dump valve for the sediment chamber, a cover fully closing the upper side of the casing with a leak-proof joint, and a compressed air inlet for the closed casing for placing the liquid to be filtered under pressure and controlling the rate of filtration.

13. In a filter, an air tight casing having an upstanding partition providing a filter chamber and a sediment chamber, a peripherally perforated drum rotatable in the filter chamber, an endless filter belt looped about the drum and looped away therefrom at spaced points on the periphery of the drum and extended above the sediment chamber, a drive roll for the belt, a collector hood having an open side confronting the periphery of the drum between the points where the belt is looped therefrom, a discharge leg for the collector hood, washing means for the belt and arranged above the sediment chamber and including a hollow washing shoe having a perforated wall, a liquid return separator passageway between the sediment chamber and filter chamber, a dump valve for the sediment chamber, drive means for the drive roll, a force pump operable by the drive means for returning liquid from the discharge leg to the hollow washing shoe, and means for admitting air under pressure into the upper portion of the casing above the normal liquid level therein.

14. In a self-cleaning continuous filter, a closed housing provided with an inlet opening for the liquid to be filtered and an outlet opening for the filtered liquid, a filter drum rotatable in the housing and having a perforated cylindrical wall, a collector hood having an open side contacting the perforated wall of the cylinder and communicating with the outlet opening, an endless filter belt looped about the drum and extending therefrom in contact with the collector hood, a drive roll for the belt, washing means in the housing for cleaning the belt in its path of movement, a dump valve for removing sediment from the housing, a motor mounted upon one side of the housing, speed reduction gearing between the motor and drive roll, and a force pump operable by the motor for returning a portion of the filtered liquid to the washing means.

15. In a self-cleaning continuous filter, a casing, a filter drum rotatable in the casing and having a perforated cylindrical wall, a collector hood having an open side confronting the cylindrical wall, an endless filter belt looped about the drum and having its edges projecting beyond the ends of the drum, a metal binding along each edge of the filter belt provided with spaced apart eyelets providing a driving strip along each edge of the belt, a drive roll for the belt having a sprocket wheel at each end thereof engaging the eyelets in the driving strip, means for imparting continuous movement to the drive roll, and cleaning means for the belt.

16. In a self-cleaning continuous filter, a closed casing having an inlet opening for the liquid to be filtered, a peripherally perforated drum rotatable in the casing, a collector hood having an open side extended across the peripheral wall of the drum for discharging filtered liquid from the drum, an endless filter belt looped about the drum and looped away from the drum in contact with the collector hood, means in the casing for cleaning the belt when looped away from the drum, and means for admitting air under pressure into the upper portion of the casing.

FERDINAND G. HENRY.